(12) United States Patent
Gafni et al.

(10) Patent No.: US 10,999,221 B2
(45) Date of Patent: May 4, 2021

(54) TRANSACTION BASED SCHEDULING

(71) Applicant: Mellanox Technologies TLV Ltd., Raanana (IL)

(72) Inventors: Barak Gafni, Campbell, CA (US); Aviv Kfir, Nili (IL); Benny Koren, Zichron Yaakov (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/459,651

(22) Filed: Jul. 2, 2019

(65) Prior Publication Data

US 2021/0006513 A1    Jan. 7, 2021

(51) Int. Cl.
*H04L 12/26*    (2006.01)
*H04L 12/861*    (2013.01)
(Continued)

(52) U.S. Cl.
CPC ............ *H04L 49/90* (2013.01); *H04L 47/621* (2013.01); *H04L 47/6255* (2013.01); *H04L 47/805* (2013.01)

(58) Field of Classification Search
None
See application file for complete search history.

(56) References Cited

U.S. PATENT DOCUMENTS

| | | |
|---|---|---|
| 6,108,713 A | 8/2000 | Sambamurthy et al. |
| 6,154,446 A | 11/2000 | Kadambi et al. |

(Continued)

FOREIGN PATENT DOCUMENTS

| | | |
|---|---|---|
| CN | 1379569 A | 11/2002 |
| EP | 1720295 A1 | 11/2006 |

(Continued)

OTHER PUBLICATIONS

Gran et al., "Congestion Management in Lossless Interconnection Networks", Submitted to the Faculty of Mathematics and Natural Sciences at the University of Oslo in partial fulfillment of the requirements for the degree Philosophiae Doctor, pp. 1-156, Sep. 2013.

(Continued)

*Primary Examiner* — Sithu Ko
(74) *Attorney, Agent, or Firm* — Kligler & Associates Patent Attorneys Ltd

(57) ABSTRACT

One embodiment includes a communication apparatus, including multiple interfaces including at least one egress interface to transmit packets belonging to multiple flows to a network, and control circuitry to queue packets belonging to the flows in respective flow-specific queues for transmission via a given egress interface, and to arbitrate among the flow-specific queues so as to select packets for transmission responsively to dynamically changing priorities that are assigned such that all packets in a first flow-specific queue, which is assigned a highest priority among the queues, are transmitted through the given egress interface until the first flow-specific queue is empty, after which the control circuitry assigns the highest priority to a second flow-specific queue, such that all packets in the second flow-specific queue are transmitted through the given egress interface until the second flow-specific queue is empty, after which the control circuitry assigns the highest priority to another flow-specific queue.

15 Claims, 4 Drawing Sheets

(51) Int. Cl.
  *H04L 12/863* (2013.01)
  *H04L 12/927* (2013.01)

(56) References Cited

U.S. PATENT DOCUMENTS

| | | |
|---|---|---|
| 6,178,448 B1 | 1/2001 | Gray et al. |
| 6,594,263 B1 | 7/2003 | Martinsson et al. |
| 6,678,277 B1 | 1/2004 | Wils et al. |
| 6,859,435 B1 | 2/2005 | Lee et al. |
| 7,321,553 B2 | 1/2008 | Prasad et al. |
| 7,346,059 B1 | 3/2008 | Gamer et al. |
| 7,738,454 B1 | 6/2010 | Panwar et al. |
| 7,773,621 B2 | 8/2010 | Jensen |
| 7,778,168 B1 | 8/2010 | Rodgers et al. |
| 7,813,348 B1 | 10/2010 | Gupta et al. |
| 7,821,939 B2 | 10/2010 | Decusatis et al. |
| 7,872,973 B2 | 1/2011 | Sterne et al. |
| 7,894,343 B2 | 2/2011 | Chao et al. |
| 8,078,743 B2 | 12/2011 | Sharp et al. |
| 8,345,548 B2 | 1/2013 | Gusat et al. |
| 8,473,693 B1 | 6/2013 | Muppalaneni et al. |
| 8,565,092 B2 | 10/2013 | Arumilli et al. |
| 8,576,715 B2 | 11/2013 | Bloch et al. |
| 8,630,294 B1 | 1/2014 | Keen et al. |
| 8,730,982 B2* | 5/2014 | Wu .................. H04L 47/50 370/412 |
| 8,767,561 B2 | 7/2014 | Gnanasekaran et al. |
| 8,811,183 B1 | 8/2014 | Anand et al. |
| 8,879,396 B2 | 11/2014 | Guay et al. |
| 8,989,017 B2 | 2/2015 | Naouri et al. |
| 8,995,265 B2 | 3/2015 | Basso et al. |
| 9,014,006 B2 | 4/2015 | Haramaty et al. |
| 9,210,095 B2* | 12/2015 | Basso .................. H04L 47/521 |
| 9,325,619 B2 | 4/2016 | Guay et al. |
| 9,356,868 B2 | 5/2016 | Tabatabaee et al. |
| 9,385,962 B2 | 7/2016 | Rimmer et al. |
| 9,426,085 B1 | 8/2016 | Anand et al. |
| 9,648,148 B2 | 5/2017 | Rimmer et al. |
| 9,699,095 B2 | 7/2017 | Elias et al. |
| 9,722,942 B2* | 8/2017 | Kitada ............... H04L 47/6215 |
| 9,742,683 B1 | 8/2017 | Vanini |
| 9,762,491 B2 | 9/2017 | Gafni et al. |
| 10,069,701 B2 | 9/2018 | Elias et al. |
| 10,069,748 B2 | 9/2018 | Shpiner et al. |
| 10,084,716 B2 | 9/2018 | Gafni |
| 10,205,683 B2 | 2/2019 | Elias et al. |
| 10,250,530 B2 | 4/2019 | Aibester et al. |
| 10,387,074 B2 | 8/2019 | Kriss et al. |
| 10,530,846 B2* | 1/2020 | Jung .................. H04L 67/1004 |
| 2002/0055993 A1 | 5/2002 | Shah et al. |
| 2002/0191559 A1 | 12/2002 | Chen et al. |
| 2003/0108010 A1 | 6/2003 | Kim et al. |
| 2003/0223368 A1 | 12/2003 | Allen et al. |
| 2004/0008714 A1 | 1/2004 | Jones |
| 2005/0053077 A1 | 3/2005 | Blanc et al. |
| 2005/0094643 A1* | 5/2005 | Wang .................. H04L 47/525 370/395.4 |
| 2005/0169172 A1 | 8/2005 | Wang et al. |
| 2005/0204103 A1 | 9/2005 | Dennison |
| 2005/0216822 A1 | 9/2005 | Kyusojin et al. |
| 2005/0226156 A1 | 10/2005 | Keating et al. |
| 2005/0228900 A1 | 10/2005 | Stuart et al. |
| 2006/0008803 A1 | 1/2006 | Brunner et al. |
| 2006/0087989 A1 | 4/2006 | Gai et al. |
| 2006/0088036 A1 | 4/2006 | De Prezzo |
| 2006/0092837 A1 | 5/2006 | Kwan et al. |
| 2006/0092845 A1 | 5/2006 | Kwan et al. |
| 2007/0041385 A1* | 2/2007 | Sali .................. H04L 49/90 370/395.21 |
| 2007/0097257 A1 | 5/2007 | El-Maleh et al. |
| 2007/0104102 A1 | 5/2007 | Opsasnick |
| 2007/0104211 A1 | 5/2007 | Opsasnick |
| 2007/0201499 A1 | 8/2007 | Kapoor et al. |
| 2007/0291644 A1 | 12/2007 | Roberts et al. |
| 2008/0037420 A1 | 2/2008 | Tang et al. |
| 2008/0175146 A1 | 7/2008 | Van Leekwuck et al. |
| 2008/0192764 A1 | 8/2008 | Arefi et al. |
| 2009/0207848 A1 | 8/2009 | Kwan et al. |
| 2010/0220742 A1 | 9/2010 | Brewer et al. |
| 2012/0155264 A1* | 6/2012 | Sharma ............... H04L 43/0852 370/232 |
| 2013/0014118 A1 | 1/2013 | Jones |
| 2013/0039178 A1 | 2/2013 | Chen et al. |
| 2013/0239119 A1* | 9/2013 | Garg .................. G06F 9/5083 718/105 |
| 2013/0250757 A1 | 9/2013 | Tabatabaee et al. |
| 2013/0250762 A1 | 9/2013 | Assarpour |
| 2013/0275631 A1 | 10/2013 | Magro et al. |
| 2013/0286834 A1 | 10/2013 | Lee |
| 2013/0305250 A1 | 11/2013 | Durant |
| 2014/0133314 A1 | 5/2014 | Mathews et al. |
| 2014/0269274 A1 | 9/2014 | Banavalikar et al. |
| 2014/0269324 A1 | 9/2014 | Tietz et al. |
| 2014/0286349 A1 | 9/2014 | Kitada |
| 2015/0026361 A1 | 1/2015 | Matthews et al. |
| 2015/0124611 A1 | 5/2015 | Attar et al. |
| 2015/0127797 A1 | 5/2015 | Attar et al. |
| 2015/0180782 A1 | 6/2015 | Rimmer et al. |
| 2015/0200866 A1 | 7/2015 | Pope et al. |
| 2015/0381505 A1 | 12/2015 | Sundararaman et al. |
| 2016/0135076 A1 | 5/2016 | Grinshpun et al. |
| 2016/0191392 A1 | 6/2016 | Liu |
| 2016/0294715 A1* | 10/2016 | Raindel .................. H04L 45/38 |
| 2016/0337257 A1 | 11/2016 | Yifrach et al. |
| 2017/0118108 A1 | 4/2017 | Avci et al. |
| 2017/0142020 A1 | 5/2017 | Sundararaman et al. |
| 2017/0180261 A1 | 6/2017 | Ma et al. |
| 2017/0187641 A1 | 6/2017 | Lundqvist et al. |
| 2017/0295112 A1 | 10/2017 | Cheng et al. |
| 2017/0373989 A1* | 12/2017 | Gafni .................. H04L 49/25 |
| 2018/0205653 A1 | 7/2018 | Wang et al. |
| 2018/0241677 A1 | 8/2018 | Srebro et al. |
| 2018/0278550 A1 | 9/2018 | Rosen et al. |

FOREIGN PATENT DOCUMENTS

| | | |
|---|---|---|
| EP | 2466476 A1 | 6/2012 |
| WO | 2009107089 A2 | 9/2009 |
| WO | 2013136355 A1 | 9/2013 |
| WO | 2013180691 A1 | 12/2013 |

OTHER PUBLICATIONS

Pfister et al., "Hot Spot Contention and Combining in Multistage Interconnect Networks", IEEE Trans on Computers, vol. C-34, pp. 943-948, Oct. 1985.

Zhu et al.,"Congestion control for large-scale RDMA deployments", SIGCOMM, ACM, pp. 523-536, Aug. 17-21, 2015.

Cisco Systems, Inc.,"Advantage Series White Paper Smart Buffering", pp. 1-16, 2016.

Hoeiland-Joergensen et al., "The FlowQueue-CoDel Packet Scheduler and Active Queue Management Algorithm", Internet Engineering Task Force (IETF) as draft-ieff-aqm-fq-codel-06 , pp. 1-23, Mar. 18, 2016.

Hahne et al., "Dynamic Queue Length Thresholds for Multiple Loss Priorities", IEEE/ACM Transactions on Networking, vol. 10, No. 3, pp. 368-380, Jun. 2002.

Choudhury et al., "Dynamic Queue Length Thresholds for Shared-Memory Packet Switches", IEEE/ACM Transactions Networking, vol. 6, Issue 2 , pp. 130-140, Apr. 1998.

Ramakrishnan et al., "The Addition of Explicit Congestion Notification (ECN) to IP", Request for Comments 3168, Network Working Group, pp. 1-63, Sep. 2001.

IEEE Standard 802.1Q™—2005, "IEEE Standard for Local and metropolitan area networks Virtual Bridged Local Area Networks", pp. 1-303, May 19, 2006.

Infiniband TM Architecture, Specification vol. 1, Release 1.2.1, Chapter 12, pp. 657-716, Nov. 2007.

IEEE Std 802.3, Standard for Information Technology—Telecommunications and information exchange between systems—

(56) References Cited

OTHER PUBLICATIONS

Local and metropolitan area networks—Specific requirements; Part 3: Carrier Sense Multiple Access with Collision Detection (CSMA/CD) Access Method and Physical Layer Specifications Corrigendum 1: Timing Considerations for PAUSE Operation, Annex 31B (MAC Control PAUSE operation), pp. 763-772, year 2005.
IEEE Std 802.1Qbb., IEEE Standard for Local and metropolitan area networks—"Media Access Control (MAC) Bridges and Virtual Bridged Local Area Networks—Amendment 17: Priority-based Flow Control", pp. 1-40, Sep. 30, 2011.
CISCO Systems, Inc., "Priority Flow Control: Build Reliable Layer 2 Infrastructure", 8 pages, 2015.
U.S. Appl. No. 15/963,118 Office action dated Aug. 21, 2019.
CN Application # 2017101379201 Office Action dated Oct. 16, 2020.

* cited by examiner

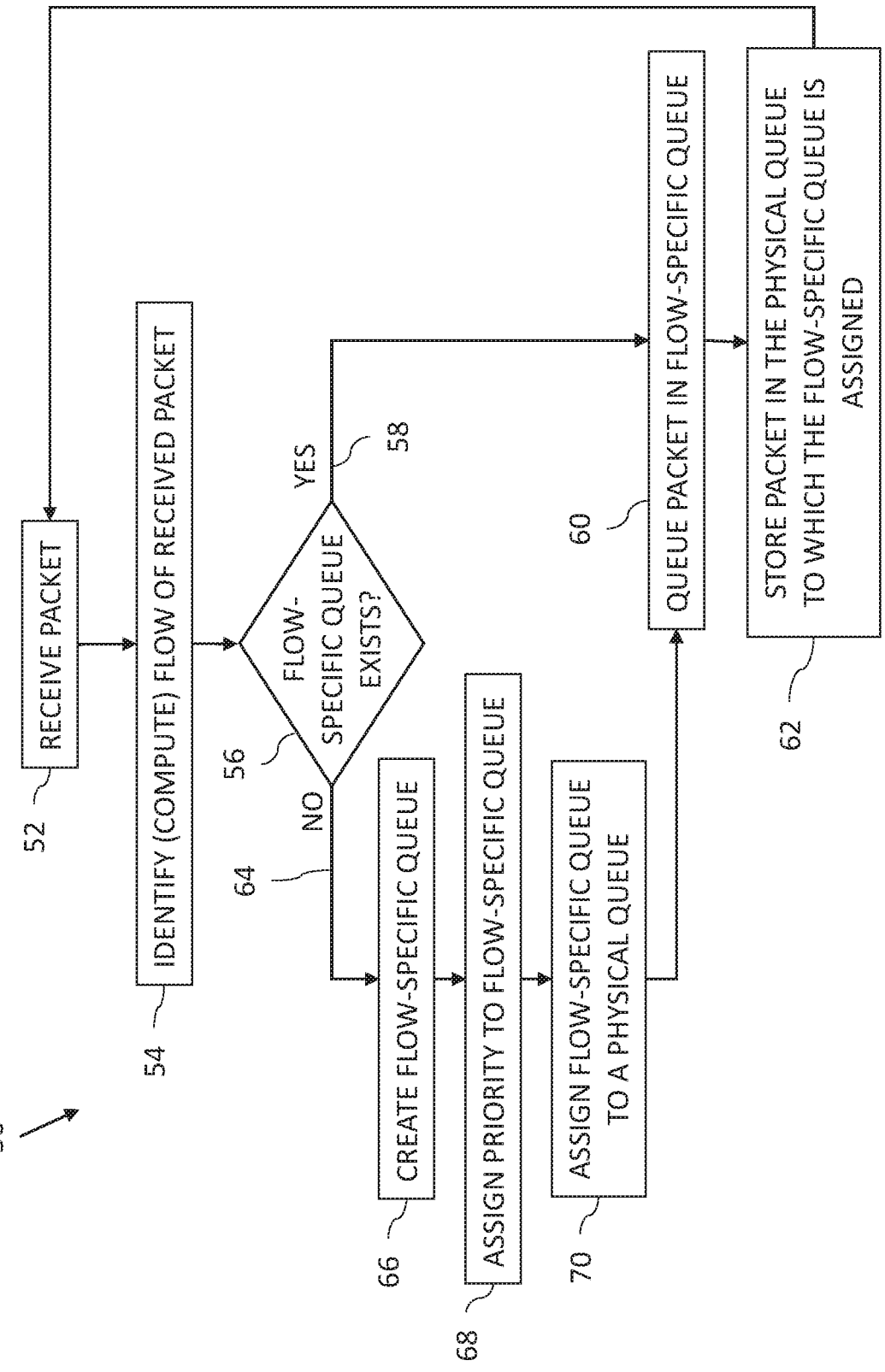

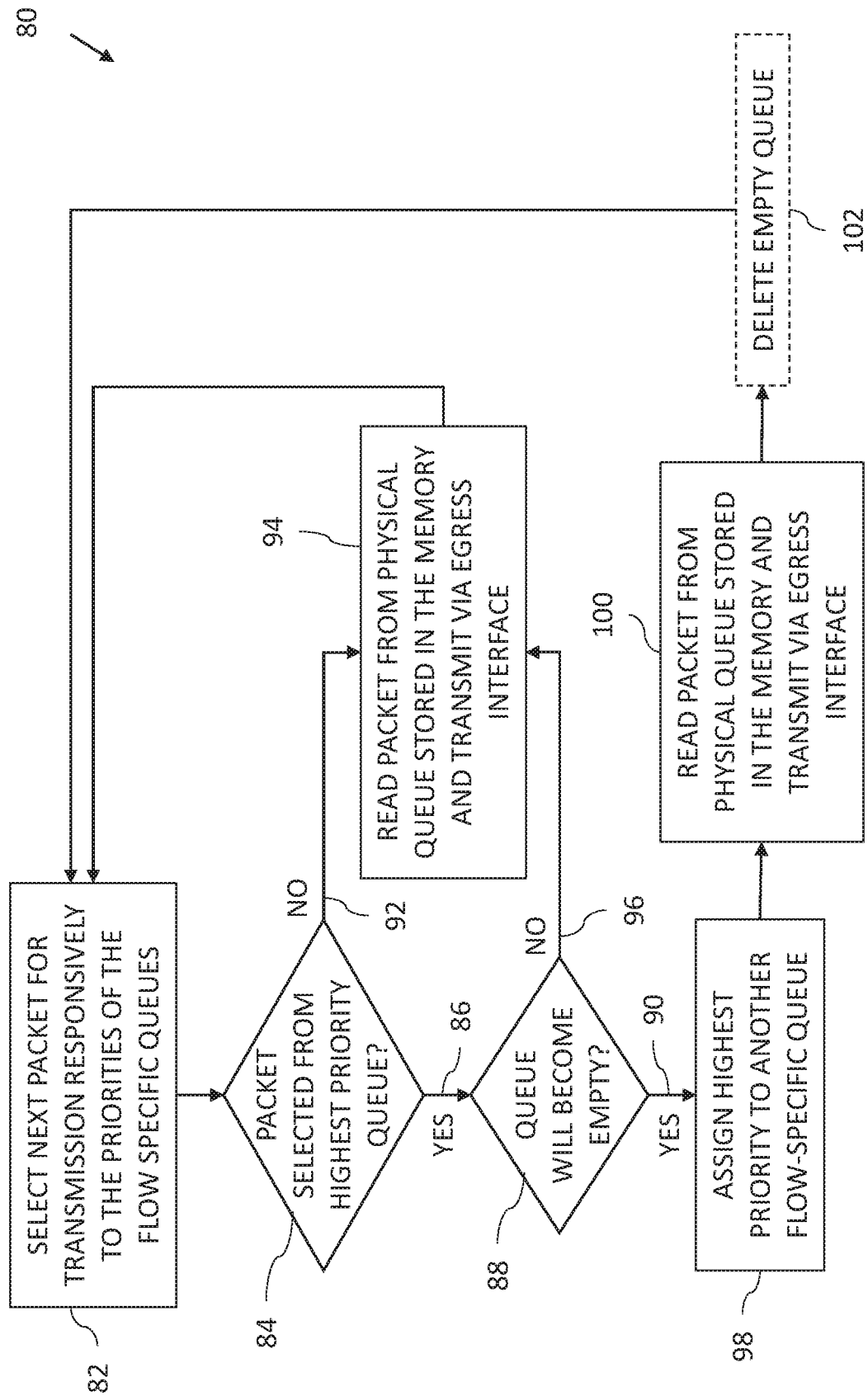

TRANSACTION BASED SCHEDULING

FIELD OF THE INVENTION

The present invention relates to network devices, and in particular, but not exclusively, to arbitration of queues in a network device.

BACKGROUND

Network devices, such as switches, bridges and routers, in modern packet communication networks commonly give priority to certain flows over others based on considerations such as differentiated quality of service (QoS) and congestion avoidance. In some networks, network devices apply adaptive flow prioritization techniques, based on considerations such as the current queue lengths of different flows.

Techniques of this sort are described, for example, by Hoeiland-Joergensen et al., in "The FlowQueue-CoDel Packet Scheduler and Active Queue Management Algorithm," published by the Internet Engineering Task Force (IETF) as draft-ietf-aqm-fq-codel-06 (Mar. 18, 2016). According to the authors, the algorithm that they describe (referred to as "FQ-CoDel") is useful in fighting "buffer-bloat" and reducing latency. FQ-CoDel mixes packets from multiple flows and reduces the impact of head of line blocking from bursty traffic, as well as providing isolation for low-rate traffic such as DNS, Web, and videoconferencing traffic. The algorithm is said to improve utilization across the networking fabric, especially for bidirectional traffic, by keeping queue lengths short.

Another flow prioritization technique is described in an Advantage Series White Paper entitled "Smart Buffering," published by Cisco Systems, Inc. (San Jose, Calif., 2016). According to this White Paper, Cisco Nexus® switches use packet prioritization to provide latency benefits for small flows under load by automatically giving priority to the first few packets from each flow. A threshold is used to determine the number of packets that have been seen from a flow. If the number of packets received from the flow is less than the prioritization threshold, the packets are prioritized; otherwise, they are not. This mechanism allows short flows to have priority in both the switch and the network to reduce the number of drops, which have significantly greater impact on short flows than on long-lived flows.

U.S. Pat. No. 7,773,621 to Jensen, describes an apparatus for selecting one of N transaction queues from which to transmit a transaction out a switch port. P round-robin vectors of P queue priorities each have N bits that are a 1-bit left-rotated and subsequently sign-extended version of an N-bit input vector with a single bit true corresponding to the last queue selected at the priority. N P-input muxes each receive a corresponding bit of each round-robin vector and select one of the inputs specified by its queue priority. Selection logic receives a transaction from each queue and selects one transaction corresponding to the queue having a transmit value greater than or equal to the queues left thereof in the input vectors. Each queue's transmit value comprises a least-significant bit equal to the corresponding mux output, a most-significant bit that is true if its transaction is transmittable, and middle bits comprising the queue priority.

US 2017/0373989 of Gafni, et al., describes a method for communication includes receiving and forwarding packets in multiple flows to respective egress interfaces of a switching element for transmission to a network. For each of one or more of the egress interfaces, in each of a succession of arbitration cycles, a respective number of the packets in each of the plurality of the flows that are queued for transmission through the egress interface is assessed, and the flows for which the respective number is zero are assigned to a first group, while the flows for which the respective number is non-zero are assigned to a second group. The received packets that have been forwarded to the egress interface and belong to the flows in the first group are transmitted with a higher priority than the flows in the second group.

SUMMARY

There is provided in accordance with an embodiment of the present disclosure, a communication apparatus, including multiple interfaces including at least one egress interface, which is configured to transmit packets belonging to multiple flows to a packet data network, and control circuitry, which is configured to queue the packets belonging to a plurality of the flows in respective flow-specific queues for transmission via a given egress interface, including at least first and second flow-specific queues, and to arbitrate among the flow-specific queues so as to select the packets for transmission responsively to dynamically changing priorities that are assigned to the flow-specific queues, and which is configured to assign the priorities to the flow-specific queues such that all the packets in the first flow-specific queue, which is assigned a highest priority among the flow-specific queues, are transmitted through the given egress interface until the first flow-specific queue is empty, after which the control circuitry assigns the highest priority to the second flow-specific queue, such that all the packets in the second flow-specific queue are transmitted through the given egress interface until the second flow-specific queue is empty, after which the control circuitry assigns the highest priority to another of the flow-specific queues.

Further in accordance with an embodiment of the present disclosure the control circuitry is configured to exclusively serve the first flow-specific queue so that none of the other flow-specific queues are served until after the first flow-specific queue which is currently being served is empty, after which the control circuitry is configured to exclusively serve the second flow-specific queue so that none of the other flow-specific queues are served until after the second flow-specific queue which is currently being served is empty.

Still further in accordance with an embodiment of the present disclosure the control circuitry is configured to assign the priorities to the flow-specific queues responsively to any one or more of the following a queue-age, a longest queue, a shortest queue, a flow importance, or round-robin.

Additionally, in accordance with an embodiment of the present disclosure, the device includes a memory, which is configured to store the packets in a plurality of physical queues, and wherein the control circuitry is configured to assign the flow-specific queues among the plurality of physical queues.

Moreover in accordance with an embodiment of the present disclosure the control circuitry is configured to serve one of the physical queues to which the first flow-specific queue, assigned the highest priority, is assigned, until all the packets belonging to the first flow-specific queue have been transmitted and the first flow-specific queue is empty.

Further in accordance with an embodiment of the present disclosure the control circuitry is configured to identify a respective one of the flows to which a respective one of the packets belongs responsively to at least a part of a packet header of the respective one of the packets.

Still further in accordance with an embodiment of the present disclosure the control circuitry is configured to compute the respective one of the flows to which the respective one of the packets belongs based at least on a hash of at least the part of the packet header of the respective one of the packets.

Additionally, in accordance with an embodiment of the present disclosure at least the part of the packet header includes any one or more of the following a source and destination internet protocol (IP) address, a source and destination layer 4 port identifier, a protocol type, or a source and destination media access control (MAC) address.

There is also provided in accordance with another embodiment of the present disclosure, a communication method, including transmitting packets belonging to multiple flows to a packet data network, queuing the packets belonging to a plurality of the flows in respective flow-specific queues for transmission via a given egress interface, including at least first and second flow-specific queues, arbitrating among the flow-specific queues so as to select the packets for transmission responsively to dynamically changing priorities that are assigned to the flow-specific queues, and assigning the priorities to the flow-specific queues such that all the packets in the first flow-specific queue, which is assigned a highest priority among the flow-specific queues, are transmitted through the given egress interface until the first flow-specific queue is empty, after which the highest priority is assigned to the second flow-specific queue, such that all the packets in the second flow-specific queue are transmitted through the given egress interface until the second flow-specific queue is empty, after which the highest priority is assigned to another of the flow-specific queues.

Moreover in accordance with an embodiment of the present disclosure, the method includes exclusively serving the first flow-specific queue so that none of the other flow-specific queues are served until after the first flow-specific queue which is currently being served is empty, after which exclusively serving the second flow-specific queue so that none of the other flow-specific queues are served until after the second flow-specific queue which is currently being served is empty.

Further in accordance with an embodiment of the present disclosure the assigning includes assigning the priorities to the flow-specific queues responsively to any one or more of the following a queue-age, a longest queue, a shortest queue, a flow importance, or round-robin.

Still further in accordance with an embodiment of the present disclosure, the method includes storing the packets in a plurality of physical queues, and assigning the flow-specific queues among the plurality of physical queues.

Additionally, in accordance with an embodiment of the present disclosure, the method includes serving one of the physical queues to which the first flow-specific queue, assigned the highest priority, is assigned, until all the packets belonging to the first flow-specific queue have been transmitted and the first flow-specific queue is empty.

Moreover, in accordance with an embodiment of the present disclosure, the method includes identifying a respective one of the flows to which a respective one of the packets belongs responsively to at least a part of a packet header of the respective one of the packets.

Further in accordance with an embodiment of the present disclosure, the method includes computing the respective one of the flows to which the respective one of the packets belongs based at least on a hash of at least the part of the packet header of the respective one of the packets.

Still further in accordance with an embodiment of the present disclosure at least the part of the packet header includes any one or more of the following a source and destination internet protocol (IP) address, a source and destination layer 4 port identifier, a protocol type, or a source and destination media access control (MAC) address.

There is also provided in accordance with still another embodiment of the present disclosure a software product, including a non-transient computer-readable medium in which program instructions are stored, which instructions, when read by a central processing unit (CPU), cause the CPU to transmit packets belonging to multiple flows to a packet data network, queue the packets belonging to a plurality of the flows in respective flow-specific queues for transmission via a given egress interface, including at least first and second flow-specific queues, arbitrate among the flow-specific queues so as to select the packets for transmission responsively to dynamically changing priorities that are assigned to the flow-specific queues, and assign the priorities to the flow-specific queues such that all the packets in the first flow-specific queue, which is assigned a highest priority among the flow-specific queues, are transmitted through the given egress interface until the first flow-specific queue is empty, after which the highest priority is assigned to the second flow-specific queue, such that all the packets in the second flow-specific queue are transmitted through the given egress interface until the second flow-specific queue is empty, after which the highest priority is assigned to another of the flow-specific queues.

BRIEF DESCRIPTION OF THE DRAWINGS

The present invention will be understood from the following detailed description, taken in conjunction with the drawings in which:

FIG. 3 is a flowchart including steps in a method of packet receipt processing in the system of FIG. 1; and FIG. 4 is a flowchart including steps in a method of packet transmission processing in the system of FIG. 1.

DESCRIPTION OF EXAMPLE EMBODIMENTS

Overview

Figure 1:
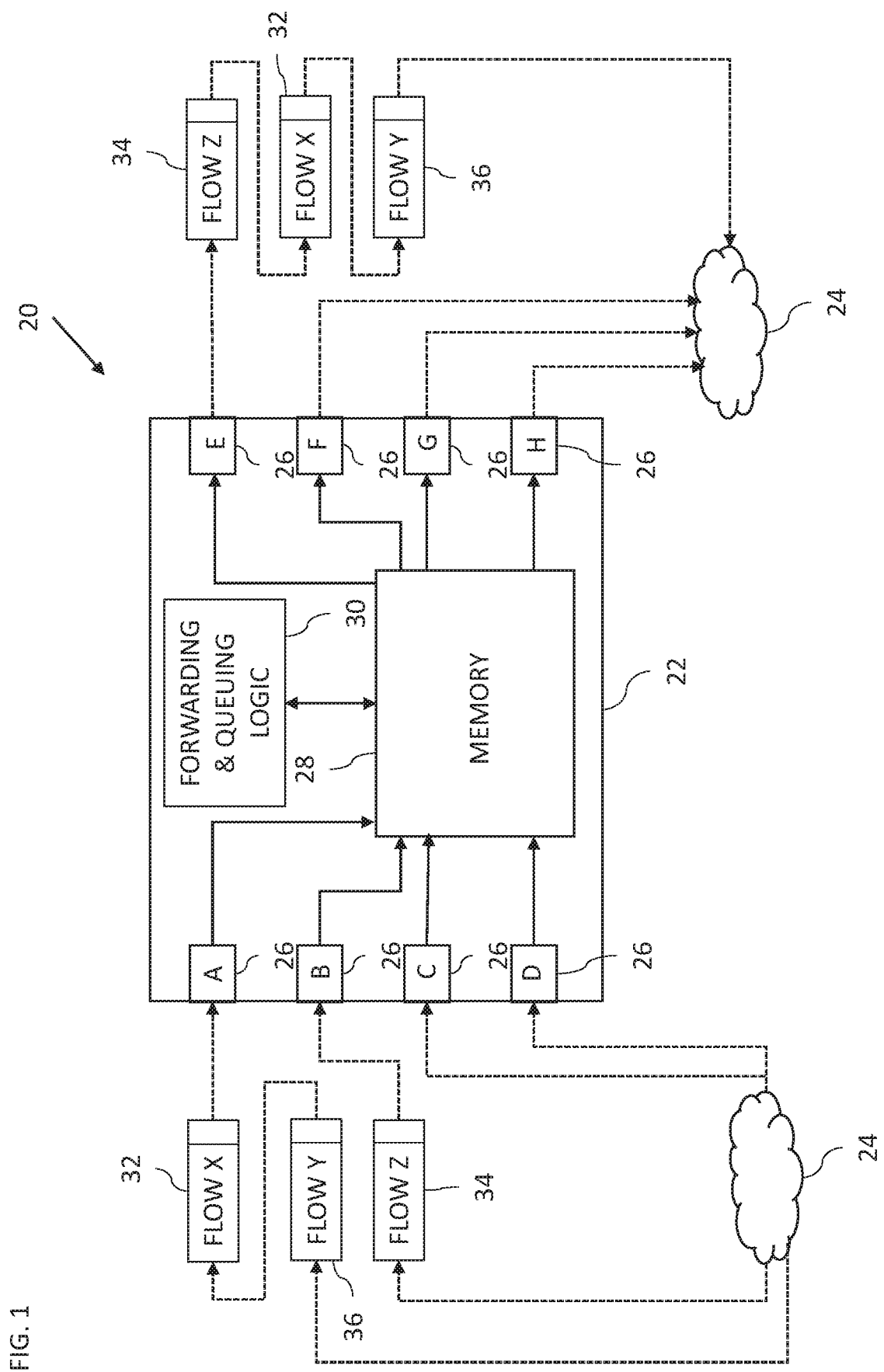
FIG. 1 is a block diagram that schematically illustrates a network communication system implementing flow prioritization, in accordance with an embodiment of the invention.

Networks elements, such as switches, are generally designed to be aware of packets rather than the application or transaction to which the packets belong. (A "transaction" may comprise, for example, a sequence of packets carrying a body of data from one computer to another.) Therefore, scheduling of network resources is generally performed on a per packet basis, usually in the context of quality of service ("QOS") in which the packet should be treated, for example, according to a QOS designation. One consequence of managing a network in this manner is that if two transactions are initiated at around the same time with the same QOS, the two transactions will complete arrival at the destination at roughly the same time. For example, if it takes time T to transmit one transaction over the network through a given network element, both transactions will complete transmission through the network element in about time 2T.

In embodiments of the present invention, a communication apparatus, for example, a router, a switch or a network interface card (NIC), optimizes completion time of transactions. The communication apparatus reduces time to completion of the transmission of transactions over the network, and allows processing or storage resources to be more effective and enables faster completion time for applications executing the transactions.

The optimization may be illustrated using the above example of two transactions that are initiated at around the same time with the same QOS. The communication apparatus prioritizes a first one of the transactions so that it completely arrives at a destination by time T, whereas the second transaction completely arrives at the destination by time 2T. The application at the destination may then start processing the first transaction at time T, and only at time 2T process the second transaction, instead of starting processing both of the transactions after time 2T. Therefore, the average time to complete the transmission of the transactions will be now (T+2T)/2 which equals 1.5T, instead of 2T in the previous example.

The communication apparatus prioritizes transactions based on the assumption that a single transaction may be characterized by a flow of packets between a given source and a given destination such that there is always at least one packet from that flow that is queued for transmission by the communication apparatus at any one time. (A "flow" is typically identified by the values of a specified set of header fields, such as the IP and TCP/UDP 5-tuple of source and destination addresses, source and destination ports, and protocol, which are consistent over all of the packets in the flow.) If there is a gap in the flow, marked by the absence of a packet from the flow being transmitted by the communication apparatus, the gap is assumed to be indicative of completion of the previous transaction. In other words, continuous occupancy of any packet of a given flow queued in the communication apparatus (the same packet does not need to be queued all the time) defines a time-bounded flow sequence, which generally corresponds to packets of a single transaction.

The communication apparatus creates and manages flow-specific queues for each of the flows being stored in the communication apparatus. Each of the flow-specific queues is served in turn such that all the packets of one queue are served for transmission by the communication apparatus and once that queue is empty (i.e. there are no more packets for that queue in a physical queuing system of the communication apparatus), another one of the flow-specific queues is served until all the packets of that queue are served for transmission by the communication apparatus, and so on. In this way, packets of one transaction are transmitted before packets of other transactions.

Flow-specific queues may be selected for serving packets using any suitable logic, for example, but not limited to, round robin, a queue-age, a longest queue, a shortest queue, or a flow importance (e.g., QOS).

In some embodiments, the flow-specific queue may be deleted from memory once the queue is empty. In other embodiments, the flow-specific queue may be retained, optionally subject to a queue expiry time, to receive packets from the same flow at a later time.

Instead of exclusively serving a single flow-specific queue at a time, the communication apparatus may allocate some resources for other queues as well (for example, for another special queue used for management packets), in order to prevent starvation of the other applications.

In other embodiments, one or more of the queues is assigned a highest priority for packet transmission and other queues are assigned a lower priority. The highest priority queue is served until all its packets have been transmitted and the queue is empty after which one of the lower priority queues is assigned as a highest priority queue, and so on.

In some embodiments, the flow-specific queues are virtual queues assigned among one or more physical queues. In these embodiments, the packets are stored in the physical queue(s) and tracked for transmission in the virtual queues. Using virtual queues adds more scalability to the functioning of the communication apparatus as the memory footprint of the virtual queues is generally minimal and using separate virtual queues for each flow allows tracking many different transactions and/or applications. Each virtual queue is generally served in turn as described above independently of the physical queues to which the virtual queues have been assigned. Each of the physical queues generally includes a link list (of descriptors or pointers) to packet(s) stored in memory. In some embodiments, the flow-specific queues include link lists (of descriptors or pointers) to the links in the physical queues.

In other embodiments, a flow-specific queue includes a general link to the physical queue to which that flow-specific queue is assigned. Once a flow-specific queue is assigned a highest priority, the physical queue to which that flow-specific queue is assigned is served until all the packets belonging to that flow-specific queue have been transmitted and that flow-specific queue is empty. The empty-state of that flow-specific queue may be tracked for example using a counter, which is incremented when a packet for that flow-specific queue is added to that physical queue and decremented when a packet for that flow-specific queue is transmitted from that physical queue. While the packets of that flow-specific queue are being transmitted, packets of other flow-specific queues assigned to that physical queue may also be transmitted as the arbitration of packets may select packets from that physical queue without regard for the flow-specific queues to which the packets belong.

As each packet is received, its flow is identified using any suitable method, for example, but not limited to, performing a computation, e.g., performing a hash, on at least a part of the packet header data, for example but not limited to a 5-tuple (e.g., a source and destination internet protocol (IP) address, a source and destination layer 4 port identifier, and a protocol type), or a source and destination media access control (MAC) address (for layer 2 packets).

The communication apparatus generally includes multiple interfaces including at least one egress interface, which transmits packets belonging to multiple flows to a packet data network. Control circuitry queues the packets belonging to a plurality of the flows in respective flow-specific queues for transmission via a given egress interface. The term "queuing", as used in the specification and claims, in all grammatical forms, is defined herein as maintaining a data structure that indicates a desired transmission order among packets waiting to be sent to a given destination and then choosing the packets for transmission based on the entries in the data structure. The term "respective" queues, as used in the specification and claims, means that each flow or other group of packets is assigned to one particular queue, but not necessarily that each queue is assigned to receive only one flow or type of packet.

The control circuitry arbitrates among the flow-specific queues so as to select the packets for transmission responsively to dynamically changing priorities that are assigned to the flow-specific queues. The control circuitry assigns the priorities to the flow-specific queues such that all the packets in a first flow-specific queue, which is assigned a highest priority among the flow-specific queues, are transmitted through the given egress interface until the first flow-specific queue is empty, after which the control circuitry assigns the highest priority to a second flow-specific queue, such that all the packets in the second flow-specific queue are transmitted through the given egress interface until the second flow-specific queue is empty, after which the control circuitry assigns the highest priority to another of the flow-specific queues, and so on. In some embodiments the flow-specific queues may be arbitrated over more than one egress interface. In some embodiments, the control circuitry exclusively serves the first flow-specific queue so that none of the other flow-specific queues are served until after the first flow-specific queue which is currently being served is empty, after which the control circuitry exclusively serves the second flow-specific queue so that none of the other flow-specific queues are served until after the second flow-specific queue which is currently being served is empty, and so on.

System Description

FIG. 1 is a block diagram that schematically illustrates a network communication system 20 implementing arbitrated flow prioritization, in accordance with an embodiment of the invention. The operation of system 20 is illustrated by a communication apparatus 22, such as a switch, which has multiple interfaces, in the form of ports 26, connected to a packet data network 24, such as an Ethernet or InfiniBand switch fabric. The ports 26 typically comprise suitable physical-layer (PHY) and data-link layer interface circuits, as are known in the art. Ports 26, which are labeled with letters A-H for clarity in the description that follows, are configured to serve as ingress and egress ports (or equivalently, ingress and egress interfaces) to network 24. Although for the sake of illustration, ports 26A-D serve in FIG. 1 as ingress ports, while ports 26E-H serve as egress ports, in practice all ports 26 are typically configured for bidirectional operation, as both ingress and egress ports.

Ports 26 receive packets from network 24 belonging to multiple flows, for forwarding to respective egress interfaces for transmission to the network. For example, in the pictured embodiment, port 26A receives a packet 32, belonging to "flow X," followed by a packet 36, belonging to "flow Y." Port 26B meanwhile receives a packet 34, belonging to "flow Z." Assuming network 24 to be an Internet Protocol (IP) network, packet flows can be identified by the packet 5-tuple (source and destination IP addresses and ports, along with the transport protocol). Alternatively, any other suitable flow identifier may be used.

The communication apparatus 22 comprises control circuitry, in the form of forwarding and queuing logic 30, which forwards incoming packets 32, 34, 36, . . . , to the appropriate egress ports 26 for transmission to network 24. In the pictured example, flows X, Y and Z are all forwarded to the same egress port 26F. Logic 30 queues the packets that are destined for each egress port in transmit queues in a memory 28, while the packets await their turn for transmission. The transmit queues include flow-specific queues, which in some embodiments may be virtual queues which are assigned to one or more physical queues storing packets in the memory 28. Logic 30 does not necessarily transmit the packets through a given egress port in their order of arrival, however, but rather gives higher priority to one or more flow-specific queues as explained above. Thus, in the pictured example, packet 36, which is stored in a highest priority flow-specific queue, is transmitted through port 26F to network 24 ahead of packets 32 and 34. The operation of this adaptive prioritization mechanism is described further hereinbelow with reference to FIGS. 2-4.

The configurations of communication apparatus 22 and network 24 that are shown in FIG. 1 are example configurations, which are chosen purely for the sake of conceptual clarity. In alternative embodiments, any other suitable network and/or switch configuration can be used. Logic 30 in communication apparatus 22 typically comprises hard-wired or programmable logic circuits, such as one or more Application-Specific Integrated Circuits (ASICs) or Field-Programmable Gate Arrays (FPGAs). Alternatively, or additionally, at least some of the functions of logic 30 may be implemented in software or firmware running on a programmable processor.

In some embodiments, the communication apparatus 22 may be implemented as any suitable communication apparatus, for example, but not limited to, a router or a network interface card (NIC), which may include an interface (e.g., Peripheral Component Interconnect Express (PCIe) interface) with a host device and one or more interfaces, e.g., port(s) 26 with the packet data network 24.

Queue Prioritization

Figure 2:
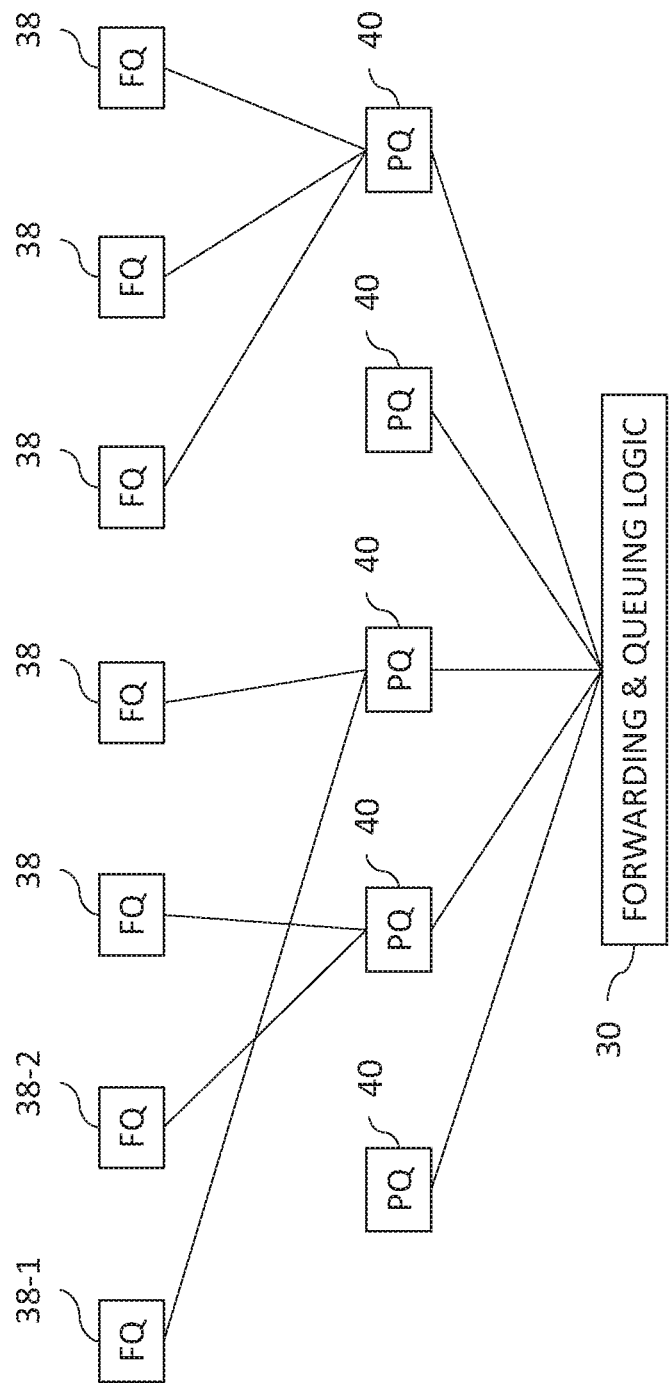
FIG. 2 is a schematic illustration of flow-specific queues for use in the system of FIG. 1.

Reference is now made to FIG. 2, which is a schematic illustration of flow-specific queues 38 for use in the system 20 of FIG. 1.

Flow-specific queues 38 are generated for packets of each flow stored in the memory 28 (FIG. 1). In some embodiments, the flow-specific queues 38 are virtual queues which are assigned to one or more physical queues 40. The memory 28 (FIG. 1) stores the packets in the physical queues 40 and the forwarding and queuing logic 30 assigns the flow-specific queues 38 among the plurality of physical queues 40. The forwarding and queuing logic 30 may create one or more physical queue 40 per port 26 (FIG. 1). Creation of flow-specific queues 38 and their assignment to physical queues 40 is discussed in more detail with reference to FIG. 3.

Using virtual queues adds more scalability to the functioning of the communication apparatus 22 as the memory footprint of the virtual queues is generally minimal and using separate virtual queues for each flow allows tracking many different transactions and/or applications. Each virtual queue is generally served in turn independently of the physical queues 40 to which the virtual queues have been assigned.

Each of the physical queues generally includes a link list (of descriptors or pointers) to packet(s) stored in memory 28. In some embodiments, the flow-specific queues 38 include link lists (of descriptors or pointers) to the links in the physical queues.

In other embodiments, a flow-specific queue includes a general link to the physical queue 40 to which that flow-specific queue 38 is assigned. Once a flow-specific queue 38 is assigned a highest priority, the physical queue 40 to which that flow-specific queue 38 is assigned is served until all the packets belonging to that flow-specific queue 38 have been transmitted and that flow-specific queue 38 is empty. The empty-state of that flow-specific queue 38 may be tracked for example using a counter, which is incremented when a packet for that flow-specific queue 38 is added to that physical queue 40 and decremented when a packet for that flow-specific queue 38 is transmitted from that physical queue 40. While the packets of that flow-specific queue 38 are being transmitted, packets of other flow-specific queues 38 assigned to that physical queue 40 may also be transmitted as the arbitration of packets may select packets from that physical queue 40 without regard for the flow-specific queues 38 to which the packets belong.

In some embodiments, the forwarding and queuing logic 30 may create multiple levels of virtual queues. In these embodiments, each of the multiple levels may be managed by an independent scheduler, which manages creation of queues, deletion of queues, and arbitration among the queues.

The forwarding and queuing logic 30 (FIG. 1) queues the packets belonging to the flows in the respective flow-specific queues 38 for transmission via a given egress interface. Each of the flow-specific queues 38 is assigned to one of the flows. In some embodiments, each flow-specific queue 38 may be assigned one or more of the flows. For example, in some embodiments, the total number of flow-specific queues 38 may be limited, and in such a case multiple flows may be assigned to a flow-specific queue.

The forwarding and queuing logic 30 arbitrates among the flow-specific queues 38 so as to select the packets for transmission responsively to dynamically changing priorities that are assigned to the flow-specific queues 38. Assignment of priorities to the flow-specific queues 38 is described in more detail with reference to FIGS. 3 and 4.

Arbitration among the flow-specific queues 38 is now described with reference to two of the flow-specific queues 38, a flow-specific queue 38-1, and a flow-specific queue 38-2. Initially, the flow-specific queue 38-1 has been assigned the highest priority among the flow-specific queues 38. The forwarding and queuing logic 30 assigns the priorities to the flow-specific queues 38 such that all the packets in the flow-specific queue 38-1, which is assigned a highest priority among the flow-specific queues 38, are transmitted through a given egress interface 26 until the flow-specific queue 38-1 is empty, after which the forwarding and queuing logic 30 assigns the highest priority to the flow-specific queue 38-2, such that all the packets in the flow-specific queue 38-2 are transmitted through the same egress interface 26 until the flow-specific queue 38-2 is empty, after which the forwarding and queuing logic 30 assigns the highest priority to another of the flow-specific queues 38, and so on.

In some embodiments, the forwarding and queuing logic 30 assigns the priorities to the flow-specific queues 38 such that the forwarding and queuing logic 30 serves one of the physical queues to which the flow-specific queue 38-1, assigned the highest priority, is assigned, until all the packets belonging to the flow-specific queue 38-1 have been transmitted and the flow-specific queue 38-1 is empty, after which the forwarding and queuing logic 30 assigns the highest priority to the flow-specific queue 38-2, and so on.

The forwarding and queuing logic 30 is configured to assign the priorities to the flow-specific queues 38, for example, to determine which queue should next receive the highest priority, responsively to any one or more of the following: a queue-age (based on the age of the oldest packet in a queue), a longest queue, a shortest queue, or a flow importance (e.g., QOS), or round robin.

In some embodiments, the highest priority may be assigned to two or more flow-specific queues 38 over a single time period.

The forwarding and queuing logic 30 may assign different lower priorities to different flow-specific queues 38 to favor some lower priority flows over others. In this manner, the forwarding and queuing logic 30 may allocate some resources for other queues 38, for example, for another special queue used for management packets, in order to prevent starvation of other applications.

In some embodiments, the forwarding and queuing logic 30 supports exclusively serving a single flow-specific queue 38 at a time. In these embodiments, the forwarding and queuing logic 30 is configured to exclusively serve the flow-specific queue 38-1 so that none of the other flow-specific queues 38 are served until after the flow-specific queue 38-1, which is currently being served, is empty, after which the forwarding and queuing logic 30 is configured to exclusively serve the flow-specific queue 38-2 so that none of the other flow-specific queues 38 are served until after the flow-specific queue 38-2, which is currently being served, is empty.

Reference is now made to FIG. 3, which is a flowchart 50 including steps in a method of packet receipt processing in the system 20 of FIG. 1.

The communication apparatus 22 receives (block 52) a packet on one of the ports 26 or when the communication apparatus 22 is implemented as a NIC, a suitable interface such as a PCIe interface or a port of the NIC.

The forwarding and queuing logic 30 identifies (block 54) the flow to which the received packet belongs, responsively to at least a part of a packet header of the received packet. In some embodiments, the forwarding and queuing logic 30 computes the flow to which the received packet belongs based at least on a hash of at least the part of the packet header of the respective one of the packets. The part of the packet header used to identify the flow (e.g., to compute the hash) may include any one or more of the following: a source and destination internet protocol (IP) address; a source and destination layer 4 port identifier; a protocol type; or a source and destination media access control (MAC) address. In some embodiments, a 5-tuple of the received packet is used to compute the hash. In other embodiments, for example, where the traffic is mainly layer 2 traffic, the hash may be based on source and destination MAC address. In some embodiments, the flow may be identified based on some other flow and/or transaction identification.

At a decision block 56, the forwarding and queuing logic 30 checks whether the flow-specific queue 38 for the identified flow exists.

If the flow-specific queues 38 for the identified flow does not currently exist (branch 64), the forwarding and queuing logic 30 creates (block 66) the flow-specific queue 38 for the identified flow, assigns (block 68) a priority to newly created flow-specific queue 38, assigns (block 70) the newly created flow-specific queue 38 to one of the physical queues 40 (FIG. 2), queues (block 60) the received packet in the newly create flow-specific queue 38, and stores (block 62) the received packet in the physical queue 40 (FIG. 2) to which the newly created flow-specific queue 38 has been assigned. A newly created flow-specific queue 38 is generally assigned a priority which is lower than the highest priority unless there are no other flow-specific queues 38 in existence in the communication apparatus 22. The newly created flow-specific queue 38 may be assigned to one of the physical queues 40 based on any suitable criteria, for example, the physical queue 40 with the least number of packets. Processing continues with the step of block 52.

If the flow-specific queue 38 for the identified flow exists (branch 58), the forwarding and queuing logic 30 queues (block 60) the received packet in the flow-specific queue 38 of the identified flow and stores (block 62) the received packet in the physical queue 40 (FIG. 2) to which the flow-specific queues 38 of the identified flow is assigned. Processing continues with the step of block 52.

Reference is now made to FIG. 4, which is a flowchart 80 including steps in a method of packet transmission processing in the system 20 of FIG. 1.

The forwarding and queuing logic 30 selects (block 82) the next packet for transmission via one of the ports 26 responsively to the priorities of the flow-specific queues 38.

At a decision block 84, the forwarding and queuing logic 30 checks whether the selected packet is being selected from a highest priority flow-specific queue 38. If the selected packet is not being selected from a highest priority flow-specific queue 38 (branch 92), the forwarding and queuing logic 30 reads (block 94) the selected packet from the physical queue 40 (to which the flow-specific queue 38 of the selected packet is assigned) stored in the memory 28 (FIG. 1), transmits the selected packet via one of the egress interfaces (ports 26), and continues processing with the step of block 82.

If the selected packet is being selected from a highest priority flow-specific queue 38 (branch 86), processing continues at a decision block 88 at which the forwarding and queuing logic 30 checks if the flow-specific queue 38 of the selected packet will become empty after the selected packet is transmitted.

If the flow-specific queue 38 of the selected packet will not become empty after the selected packet is transmitted (branch 96), as there is at least one other packet in that flow-specific queue 38, the forwarding and queuing logic 30 reads (block 94) the selected packet from the physical queue 40 (to which the flow-specific queue 38 of the selected packet is assigned) stored in the memory 28 (FIG. 1), transmits the selected packet via one of the egress interfaces (ports 26), and continues processing with the step of block 82.

If the flow-specific queue 38 of the selected packet will become empty after the selected packet is transmitted (branch 90), the forwarding and queuing logic 30 assigns (block 98) the highest priority to another flow-specific queue 38 according to criteria described above, reads (block 100) the selected packet from the physical queue 40 (to which the flow-specific queue 38 of the selected packet is assigned) stored in the memory 28 (FIG. 1), transmits the selected packet via one of the egress interfaces (ports 26), optionally deletes (block 102) the empty queue, and continues processing with the step of block 82.

In some embodiments, the forwarding and queuing logic 30 monitors an empty state of the highest priority flow-specific queue(s) 38 independently of packet transmission processing. For example, the forwarding and queuing logic 30 monitors an empty state of the highest priority flow-specific queue(s) 38 on a periodic basis.

In practice, some or all of the functions of the forwarding and queuing logic 30 may be combined in a single physical component or, alternatively, implemented using multiple physical components. These physical components may comprise hard-wired or programmable devices, or a combination of the two. In some embodiments, at least some of the functions of the forwarding and queuing logic 30 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The software components of the present invention may, if desired, be implemented in ROM (read only memory) form. The software components may, generally, be implemented in hardware, if desired, using conventional techniques. The software components may be instantiated, for example: as a computer program product or on a tangible medium. In some cases, it may be possible to instantiate the software components as a signal interpretable by an appropriate computer, although such an instantiation may be excluded in certain embodiments of the present invention.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A communication apparatus, comprising:
multiple interfaces including at least one egress interface, which is configured to transmit packets belonging to multiple flows to a packet data network; and
control circuitry, which is configured to:
identify a respective one of the flows to which a respective one of the packets belongs responsively to at least a part of a packet header of the respective one of the packets;
queue the packets belonging to a plurality of the flows in respective flow-specific queues for transmission via a given egress interface, including at least first and second flow-specific queues; and
arbitrate among the flow-specific queues so as to select the packets for transmission responsively to dynamically changing priorities that are assigned to the flow-specific queues, and which is configured to assign the priorities to the flow-specific queues, wherein all the packets in the first flow-specific queue, which is assigned a highest priority among the flow-specific queues, are transmitted through the given egress interface until the first flow-specific queue is empty, after which the control circuitry is configured to assign the highest priority to the second flow-specific queue, such that all the packets in the second flow-specific queue are transmitted through the given egress interface until the second flow-specific queue is empty, after which the control circuitry is configured to assign the highest priority to another of the flow-specific queues.

2. The communication apparatus according to claim 1, wherein the control circuitry is configured to exclusively serve the first flow-specific queue so that none of the other flow-specific queues are served until after the first flow-specific queue which is currently being served is empty, after which the control circuitry is configured to exclusively serve the second flow-specific queue, none of the other flow-specific queues being served until after the second flow-specific queue which is currently being served is empty.

3. The communication apparatus according to claim 1, wherein the control circuitry is configured to assign the priorities to the flow-specific queues responsively to any one or more of the following: a queue-age; a longest queue; a shortest queue; a flow importance; or round-robin.

4. The communication apparatus according to claim 1, further comprising a memory, which is configured to store the packets in a plurality of physical queues, and wherein the control circuitry is configured to assign the flow-specific queues among the plurality of physical queues.

5. The communication apparatus according to claim 4, wherein the control circuitry is configured to serve one of the physical queues to which the first flow-specific queue, assigned the highest priority, is assigned, until all the packets belonging to the first flow-specific queue have been transmitted and the first flow-specific queue is empty.

6. The communication apparatus according to claim 1, wherein the control circuitry is configured to compute the respective one of the flows to which the respective one of the packets belongs based at least on a hash of at least the part of the packet header of the respective one of the packets.

7. The communication apparatus according to claim 1, wherein at least the part of the packet header includes any one or more of the following: a source and destination internet protocol (IP) address; a source and destination layer 4 port identifier; a protocol type; or a source and destination media access control (MAC) address.

8. A communication method, comprising:
transmitting packets belonging to multiple flows to a packet data network;
identifying a respective one of the flows to which a respective one of the packets belongs responsively to at least a part of a packet header of the respective one of the packets;
queuing the packets belonging to a plurality of the flows in respective flow-specific queues for transmission via a given egress interface, including at least first and second flow-specific queues;
arbitrating among the flow-specific queues so as to select the packets for transmission responsively to dynamically changing priorities that are assigned to the flow-specific queues; and
assigning the priorities to the flow-specific queues wherein all the packets in the first flow-specific queue, which is assigned a highest priority among the flow-specific queues, are transmitted through the given egress interface until the first flow-specific queue is empty, after which the highest priority is assigned to the second flow-specific queue, such that all the packets in the second flow-specific queue are transmitted through the given egress interface until the second flow-specific queue is empty, after which the highest priority is assigned to another of the flow-specific queues.

9. The communication method according to claim 8, further comprising exclusively serving the first flow-specific queue so that none of the other flow-specific queues are served until after the first flow-specific queue which is currently being served is empty, after which exclusively serving the second flow-specific queue none of the other flow-specific queues being served until after the second flow-specific queue which is currently being served is empty.

10. The communication method according to claim 8, wherein the assigning includes assigning the priorities to the flow-specific queues responsively to any one or more of the following: a queue-age; a longest queue; a shortest queue; a flow importance; or round-robin.

11. The communication method according to claim 8, further comprising:
storing the packets in a plurality of physical queues; and
assigning the flow-specific queues among the plurality of physical queues.

12. The communication method according to claim 11, further comprising serving one of the physical queues to which the first flow-specific queue, assigned the highest priority, is assigned, until all the packets belonging to the first flow-specific queue have been transmitted and the first flow-specific queue is empty.

13. The communication method according to claim 8, further comprising computing the respective one of the flows to which the respective one of the packets belongs based at least on a hash of at least the part of the packet header of the respective one of the packets.

14. The communication method according to claim 8, wherein at least the part of the packet header includes any one or more of the following: a source and destination internet protocol (IP) address; a source and destination layer 4 port identifier; a protocol type; or a source and destination media access control (MAC) address.

15. A software product, comprising a non-transient computer-readable medium in which program instructions are stored, which instructions, when read by a central processing unit (CPU), cause the CPU to:
transmit packets belonging to multiple flows to a packet data network;
identify a respective one of the flows to which a respective one of the packets belongs responsively to at least a part of a packet header of the respective one of the packets;
queue the packets belonging to a plurality of the flows in respective flow-specific queues for transmission via a given egress interface, including at least first and second flow-specific queues;
arbitrate among the flow-specific queues so as to select the packets for transmission responsively to dynamically changing priorities that are assigned to the flow-specific queues; and
assign the priorities to the flow-specific queues wherein all the packets in the first flow-specific queue, which is assigned a highest priority among the flow-specific queues, are transmitted through the given egress interface until the first flow-specific queue is empty, after which the highest priority is assigned to the second flow-specific queue, such that all the packets in the second flow-specific queue are transmitted through the given egress interface until the second flow-specific queue is empty, after which the highest priority is assigned to another of the flow-specific queues.

* * * * *